United States Patent [19]

Carson et al.

[11] Patent Number: 5,268,438
[45] Date of Patent: Dec. 7, 1993

[54] AROMATIC POLYESTER MELT STRENGTH IMPROVER

[75] Inventors: William G. Carson, Moorestown, N.J.; Choung H. Lai, Newtown; Nazir A. Memon, Yardley, both of Pa.

[73] Assignee: Rohm and Haas Company, Philadelphia, Pa.

[21] Appl. No.: 755,701

[22] Filed: Sep. 6, 1991

[51] Int. Cl.$^5$ .................. C08F 24/00; C08F 212/08; C08F 220/20

[52] U.S. Cl. .................. 526/273; 526/320; 526/329.2

[58] Field of Search .................. 526/320, 329.2, 273

[56] References Cited

U.S. PATENT DOCUMENTS

| | | | |
|---|---|---|---|
| 2,572,951 | 10/1951 | Roedel | 526/320 |
| 3,002,959 | 10/1961 | Hicks | 526/320 |
| 3,288,883 | 11/1966 | Temin et al. | 526/320 |
| 3,312,654 | 4/1967 | Pratt et al. | 526/320 |
| 3,553,157 | 1/1971 | Dijkstra et al. | |
| 4,034,013 | 7/1977 | Lane | |
| 4,145,466 | 3/1979 | Leslie et al. | |
| 4,176,101 | 11/1979 | Leslie et al. | |
| 4,243,790 | 1/1981 | Foley, Jr. | 526/320 |
| 4,243,791 | 1/1981 | Hargreaves et al. | 526/320 |
| 4,246,378 | 1/1981 | Kometani et al. | |
| 4,327,202 | 4/1982 | Foley, Jr. | 526/320 |
| 4,529,787 | 7/1985 | Schmidt et al. | 526/320 |
| 4,652,605 | 3/1987 | Chang et al. | 526/320 |
| 4,912,167 | 3/1990 | Deyrup et al. | |
| 5,006,592 | 4/1991 | Oshima et al. | |
| 5,102,952 | 4/1992 | Memon | 525/66 |

FOREIGN PATENT DOCUMENTS

| | | | |
|---|---|---|---|
| 0197460 | 10/1986 | European Pat. Off. | 526/320 |
| 381432 | 8/1990 | European Pat. Off. | |
| 247616 | 9/1988 | Japan | |
| 2201683 | 9/1988 | United Kingdom | 526/320 |
| 9000570 | 1/1990 | World Int. Prop. O. | 526/320 |

OTHER PUBLICATIONS

Polymer Engineering and Science, vol. 30, No. 17, 1041–1050 (1990); A. Auerbach and J. Sell.
Modern Plastics, vol. 68, No. 8, 40–43 (1991); J. Rogers.

*Primary Examiner*—Joseph L. Schofer
*Assistant Examiner*—N. Sarofim
*Attorney, Agent, or Firm*—Darryl P. Frickey; Roger K. Graham

[57] ABSTRACT

Melt strengths and melt viscosities of aromatic polyesters are increased substantially by the addition of small amounts of certain high molecular weight vinyl aromatic modifiers which disperse very readily in aromatic polyesters.

6 Claims, No Drawings

AROMATIC POLYESTER MELT STRENGTH IMPROVER

FIELD OF INVENTION

This invention relates to polymer compositions for improving thermoplastic processing and molding of aromatic polyester, improved polyester blends, and articles produced therefrom.

BACKGROUND OF THE INVENTION

Aromatic polyesters generally have low melt viscosities or melt strength because of the limits to which their molecular weights can be raised and because many of them are crystalline and have high melting points. Melt processing must be carried out at temperatures at least close to or above these high melting points and viscosities are thereby reduced.

High melt strength is very important for extrusion processing and particularly for extrusion blow molding. This process requires the extrusion of a parison which must be suspended in melt form prior to enclosure in a mold. Most aromatic polyesters lack sufficient melt strength at the processing temperatures which must be used for extrusion blow molding. Commercially available, high molecular weight PET (i.e.poly (ethylene terephthalate)) resins and copolyesters which are either non-crystalline or have lower melting points than PET can be extrusion blow molded, but usually can be used only for making small containers which require less melt strength. The copolymer modifier compositions of this invention increase polyester melt strength and permit even large containers to be extrusion blow molded using only modest modifier concentrations (i.e. from about 1 to about 30%).

In most cases clear blow molded containers are desired, and therefore the copolymer modifier must not reduce the clarity found with amorphous aromatic polyesters. Another object of this invention is to provide a modifier which will not reduce amorphous polyester clarity.

PET generally has an intrinsic viscosity of about 0.5 to 1.1 dl. per gm. and insufficient melt strength for extrusion blow molding applications. Furthermore, PET exhibits a fast rate of crystallization at temperatures above 140° C. which makes the achievement of clear amorphous articles by such thermoplastic fabrication techniques difficult.

Articles produced from PET are usually made by injection-stretch blow-molding techniques in which a parison or preform is injection molded, cooled rapidly and then reheated to a temperature above the $T_g$ (glass transition temperature) but below the crystalline melting point and then blown with stretch orientation to the desired shape. See U.S. Pat. Nos. 3,733,309; 3,745,150; and 3,803,275.

Polyesters that are semicrystalline (e.g. particularly poly(ethylene terephthalate)), are used extensively in many applications that require good solvent resistance and good properties at elevated temperatures. They are frequently processed by injection-stretch blow molding, but there are many components of automobiles and other systems wherein such parts are hollow, and to manufacture these by injection-stretch blow molding is very difficult and expensive. Many such hollow parts can conceivably be made by extrusion-blow molding provided the polymer system has adequate melt strength and viscosity. Unfortunately, polyesters commonly used for injection-stretch blow molding have melt viscosities which are too low to make them suitable for extrusion blow molding. High molecular weight polyesters can be made by solid phase polymerization to make them suitable for extrusion blow molding, but this operation raises the cost of the polyester substantially. Therefore it would be desirable to have extrusion blow moldable polyester compositions made from commercial injection-stretch blow moldable grades of polyesters.

A number of patents deal with polyester melt strength and the extrusion blow molding of polyesters. Some of these teach very high molecular weight polyesters or branched polyesters, others teach copolyesters that are non-crystalline or have reduced melting points, still others describe coextrusion of polyesters with higher viscosity polymers or modification of polyesters with fibers.

There are several patents covering melt strength improvers for polyesters. See U.S. Pat. No. 3,553,157 (Dijkstra et al.), U.S. Pat. No. 4,156,466 (Leslie et al.), U.S. Pat. No. 4,176,101 (Leslie et al.), and U.S. Pat. No. 4,912,167 (Deyrup et al.). Several other patents cover impact modifiers for polyesters which coincidentally improve melt strength. See U.S. Pat. No. 4,034,013 (Lane), U.S. Pat. No. 4,246,378 (Kowetaini et al.), and JP Kokai 90-145011/19. These include core-shell type impact modifiers.

Some of the modifiers described in these references are polymeric. Others are small molecule compounds. Several of these modifiers contain functional groups (e.g. anhydride, isocyanate, epoxy) which are potentially capable of coreacting with the hydroxyl or carboxyl end groups of the polyester. Presumably, these modifiers increase the molecular weight of the polyester by coupling end groups or by forming branches and thereby raise the melt viscosity or melt strength. The low molecular weight modifiers are said to produce clear polyester blends in cases where the polyester is maintained in its amorphous form. Other modifiers appear to contribute varying degrees of haze depending on degree of coreaction and molecular weight.

Since all these modifiers appear to react with polyesters to some degree during melt processing, close control of processing conditions is required to obtain a desired melt strength improvement. Deviation from these conditions can produce insufficient melt strength or in some cases, excessive melt strength. Since the melt strength is dependent on an increase in the effective molecular weight of the polyester, modified resins of this type will be particularly sensitive to hydrolytic degradation which can rapidly reduce molecular weight and melt strength.

For example, in U.S. Pat. No. 3,553,157 (Dijkstra et al.), thick-walled shaped articles which had improved impact strength were prepared from PET and a compound capable of reacting with hydroxyl or carboxyl end groups, for example polyanhydrides. "Thick-walled" is defined by Dijkstra et al. as "shape and/or dimensions are such that they are not readily conducive to orientation of the polymer by drawing." Dijkstra et al. prefer crystalline articles reinforced by glass fibers, and teach nothing with regard to methods of producing extrusion blow-molded articles, blown film or foam from PET, nor anything regarding enhancement of melt characteristics of PET. Dijkstra et al. shows poly-functional compounds as chain extending agents for poly(alkylene terephthalates).

Further, the addition of an organic sulfonate or an organic sulfonate salt to a mixture of polyester and di- and polyepoxides, and also the addition of ethylene copolymers containing glycidyl groups have been suggested for increasing the melt strength and viscosity of polyesters (see Kometani et al., U.S. Pat. No. 4,246,378). These solutions to the problem have improved polyesters for certain blow molding applications but have proved to be inadequate in providing materials suitable for extrusion blow molding large objects having complex cross-sections such as automobile parts, large bottles and containers.

The object of the present invention is to provide a composition for improving thermoplastic processing and molding of aromatic polyester, such as PET or PET copolyesters, for forming amorphous articles. It is a further object to provide a blend of a melt strength improver and an aromatic polyester for improving thermoplastic processing and molding of aromatic polyesters. A still further object is to provide a clear amorphous extrusion/melt shaped PET or PET copolyester articles. Another object is to provide clear polyester bottles by extrusion blow-molding.

SUMMARY OF THE INVENTION

In the instant invention, melt strengths and melt viscosities of aromatic polyesters are increased substantially by addition of small amounts of certain high molecular weight vinyl aromatic (e.g. styrene) modifiers which disperse very readily in aromatic polyesters.

These and other objects as will become apparent from the following disclosure are achieved by the present invention which comprises in one aspect a composition for improving the thermoplastic processing and molding characteristics of aromatic polyesters, such as PET.

The melt strength improver (i.e. copolymer modifier composition) of this invention is a copolymer having a molecular weight of about 1.0 million to about 4.0 million, and comprises:
(A) about 60 to about 99 percent by weight derived from a vinyl aromatic monomer;
(B) about 1.0 to about 40 percent by weight derived from a hydroxyalkyl (meth)acrylate or epoxy alkyl (meth)acrylate; and
(C) 0 to about 25 percent by weight derived from an alkyl methacrylate or alkyl acrylate.

In another aspect, the invention comprises blending of the modifier composition with aromatic polyesters and copolyesters. A still further aspect of the invention comprises films, pipes, foams, containers, profiles, or other articles prepared in accordance with the above-mentioned composition and blends.

DETAILED DESCRIPTION OF THE INVENTION

It has been found that certain high molecular weight vinyl aromatic (e.g. styrene) copolymers and terpolymers appear to disperse very rapidly in aromatic polyesters to produce a large increase in melt strength, while maintaining excellent clarity. For example, the styrene copolymers and terpolymers (i.e. "modifiers") which give this unexpected result are derived from hydroxyalkyl (meth)acrylates, for example, hydroxyethyl (meth)acrylate (HEMA, HEA), hydroxypropyl (meth) acrylate (HPMA, HPA), hydroxyethyl acrylate (HEA), and (meth)acrylates containing epoxy functionality, for example, glycidyl methacrylate (GMA). Other styrene copolymers and terpolymers are very much less effective.

The melt viscosities of these high molecular weight styrene modifiers are much greater than those of the polyesters. This normally makes dispersion of such modifiers very difficult to achieve. However, because of the apparently good dispersion of these modifiers, the melt strength of their polyester blends is much greater than that of unmodified or neat polyesters.

The refractive index (RI) of these modifiers can be adjusted to match that of the polyesters with which they are blended (i.e. about 1.55 to about 1.58). This produces a clear blend under processing conditions which will maintain the polyester in its amorphous form. Adjustment of the modifier RI can be made without adversely affecting melt strength enhancement.

The modifiers of this invention have a molecular weight of about 1.0 million to about 4.0 million, and more preferred about 1.5 million to about 4.0 million. The vinyl aromatic monomer is styrene, para-methyl styrene, chlorostyrene, vinyl toluene, dibromostyrene, tribromostyrene, vinyl naphthylene, and the like. The hydroxyalkyl (meth)acrylate or epoxy alkyl (meth)acrylate is hydroxyethyl (meth)acrylate, hydroxypropyl (meth)acrylate, or glycidyl (meth)acrylate. Optionally, a third comonomer is added to adjust the RI. This third comonomer is usually alkyl (meth)acrylate (such as $C_1$–$C_4$ alkyl (meth)acrylate, and the like), but it can be any monomer which copolymerizes well with the other two monomers and produces a terpolymer having a RI to match that of the polyesters with which it is blended. The preferred modifier composition has a styrene/hydroxy alkyl (meth)acrylate or styrene/epoxy alkyl (meth)acrylate (i.e. ST/HEMA, ST/HPMA, or ST/GMA) ratio (by weight) of roughly about 99/1 to about 3/2, and more preferred about 40/1 to about 5/1, and most preferred about 25/1 to about 5/1.

These copolymer modifiers can be prepared by emulsion, bulk or suspension polymerization. The preferred procedure is emulsion polymerization using soaps, initiators and processing conditions normally used for making polystyrene. Isolation from the emulsion can be achieved by standard procedures such as spray drying or coagulation.

It is important that no crystallization promoter is present in the composition since this invention is directed to compositions suitable for producing amorphous, non-crystalline articles. If substantial crystallization occurs in the process the resultant articles become opaque and brittle. In some cases, such as with pipe, foam and profile extrusion, a small degree of crystallinity may be acceptable and can be achieved by control of the cooling cycle. However, in most cases it is preferred to prepare amorphous articles on standard extrusion equipment. The type of articles to be produced, whether it be bottles, films, foams, pipes, tubing, sheet or profiles, will govern the auxiliary equipment to be employed. For instance, to produce bottles, extrusion blow molding equipment is necessary. To produce film, blown film equipment is necessary.

The aromatic polyesters, such as PET, and copolyesters, such as Eastman PETG (i.e. (poly)ethylene-co-1,4-cyclohexanedimethylene terphthlate), of this invention include poly ($C_1$ to $C_6$ alkylene terephalates), naphthalene dicarboxylates and aromatic polyesters containing units derived from at least one aliphatic diol or cycloaliphatic diol or combinations of aliphatic diols and cycloaliphatic diols and one or more dibasic acids. Examples include polyethylene terephthalate (PET), polybutylene terephthalate, polypentylene terephthalate, and the like, or an aromatic copolyester which contains units derived from two glycols (e.g. ethylene glycol, and cyclohexanedimethanol) or from two dibasic acids (e.g. terephthalic acid and isophthalic acid).

The modifiers and polyesters are combined by melt blending in an extruder. A mix of the two components can be directly extrusion blow molded or the components can be combined in an initial blending step and the pellets from this blend can then be extrusion blow molded. The concentration of modifier in these polyester blends can range from about 1 to about 30% by weight. The required modifier concentration will depend on the molecular weight of the polyester and the temperature at which the melt is processed. Below 1%, no significant effect is seen. Blends contain aromatic polyester or copolyester which has an intrinsic viscosity of greater than or equal to 0.7 dl/g. Articles such as containers, bottles, foam, or hollow parts may be extrusion blow molded from polyester blends described herein.

Blending can be accomplished by melt extrusion in an extruder at temperatures of about 380° to 600° F., preferably about 400° to 525° F. For example, a high work, two stage screw which has a length/diameter ratio of about 24/1, and a compression ratio of about 3.0 to 3.5 gives a very adequate dispersion of the modifier in the polyester. A dwell time in the extruder of 1 to 5 minutes is adequate to insure complete mixing or dispersion under most conditions but of course lower and higher dwell times can certainly be used. Preferably the strands produced by extruder blending are pelletized and dried to a moisture content of less than 0.03 percent before extrusion blow molding.

The ingredients used to make the composition of the invention are dispersed uniformly and it has been found that melt blending the ingredients, by using such equipment as a melt extruder (e.g. single screw extruders or twin screw extruders) in a separate step prior to blow molding is desirable. The blended product may be pelletized (i.e. the extruded strand is quenched and cut), dried and used for subsequent blow molding purposes using an extrusion blow molding machine (e.g. made by Bekum Inc. or Battenfeld Fischer Inc.) and fabricated into hollow articles such as containers.

Other additives as are known to those familiar with polymer compounding may be included in the composition. These other additives may include antioxidants, flame retardants, reinforcing agents such as glass fiber and flake, mineral fillers, ultraviolet light stabilizers, heat and light stabilizers, lubricants, dyes, pigments, mold release agents, fillers and the like. Minor amounts of other polymers can also be incorporated in the present compositions, such as polycarbonates. Most of these additives will adversely affect clarity.

The use of conventional additives such as antioxidants, thermal stabilizers, fillers, pigments and flame retardant additives can be used in the composition of this invention provided they do not exert any adverse effect on the melt strength. It is preferred not to have glass fiber reinforcement in clear article applications. It is highly preferred that clear articles are produced.

The polyesters must be thoroughly dried prior to melt processing to minimize the rapid hydrolytic degradation known to occur at processing temperatures and to reduce melt viscosity. The modifiers are much less sensitive to hydrolytic degradation than the polyesters. Higher than necessary melt temperatures should be avoided during processing to keep the melt strength as high as possible. Melt cooling should be carried out as rapidly as possible to prevent polyester crystallization and the loss of clarity.

The shaping step can be accomplished by injecting air or inert gas into the molten composition, so that articles such as bottles, foams, hollow parts, and containers can be made. Shaping is accomplished by extrusion blow-molding wherein a hollow tube or parison of molten resin is extruded vertically downward until a prespecified length has been achieved. The length of the parison depends upon the size of the bottle to be produced. The tube of molten resin is cut and carried to the blow-molding equipment where it is clamped into a mold having a shape of the bottle to be produced. It is then blown with fluid, usually air, to conform to the mold shape, and then is cooled and ejected. The mold walls are usually cooled with tap water. Unmodified PET is generally unsuitable for these types of operations because it does not have sufficient melt strength to prevent sagging.

The vinyl aromatic copolymer modifiers of this invention are thought to be effective for increasing the melt strength of aromatic polyesters because they have high viscosities owing to their high molecular weights and because they can be readily dispersed in the polyester to impart a viscosity increase to the blend. Specific reasons for the ease of dispersion in polyesters and for the viscosity increases obtained with ST/hydroxy alkyl methacrylate (i.e. HEMA, HPMA) or epoxy alkyl (meth)acrylate (i.e. GMA) copolymers or terpolymers as compared to other styrene copolymers such as ST/MAA or ST/maleic anhydride are unknown. It is possible that these modifiers could be very compatible with the polyesters or they could coreact. It is suspected that compatibility rather than coreaction is the primary explanation.

The clarity found with the polyester/modifier blends is probably influenced by a match between the refractive index (RI's) of the modifier and the polyester. Clarity can also be affected by modifier contamination and by how completely polyester crystallization can be minimized.

The availability of these copolymer modifiers will permit users to extrusion blow mold clear containers and hollow parts on existing blow molding equipment. Currently, clear containers made on blow molding equipment are composed almost entirely of PVC. Clear PVC bottles have a good balance of mechanical properties, processability, clarity and cost. However, PVC containers are increasingly coming under attack by environmentalists and governmental regulations because of problems with their disposal and recyclability. The polymers which are both recyclable and environmentally acceptable, and which have properties and cost approximating PVC, are aromatic polyesters and copolyesters. For example, the recycling of PET has become very popular as a way to reduce the amount of trash, as well as to conserve valuable raw materials. Sorted, ground, and cleaned flake from PET bottles is in great demand for a variety of uses such as fiberfill for pillows and sleeping bags, carpet fiber, injection molded parts, and film and sheet. Recycled PET can also be used for making resins for such applications as sailboats, shower units, and floor tiles. Further, the modifier of this invention should not adversely affect recycling polyester. If these aromatic polyesters and copolyesters, through modification could be processed on extrusion blow molding equipment currently used for PVC, they could take over much of the large PVC market (Rogers, *Continuous Extrusion Blow Molding of PET is Ready to Take on PVC*, Modern Plastics, pages 40–42, (August 1991).

The preferred poly(alkylene terephthalates) are polyethylene terephthalate (PET) and copolyesters of PET. Blends with other polyesters are also suitable. For example, blends of two or more polyesters may also be used, with polyester blends which have poly(ethylene terephthalate) being preferred.

EXAMPLES

The following examples and comparative examples are presented to illustrate but a few embodiments of the invention, and the invention should not be limited by these examples. All parts and percentages are by weight unless otherwise indicated, and the following abbreviations are employed in the examples and throughout the text:

BA=butyl acrylate
EA=ethyl acrylate
ST=styrene
HEMA=hydroxy ethyl methacrylate
MMA=methyl methacrylate
MAA=methacrylic acid
HPMA=hydroxy propyl methacrylate
GMA=glycidyl methacrylate
PET=poly(ethylene terephthalate)
PBT=poly(butylene terephthalate).

MOLECULAR WEIGHT OF MODIFIER

A fractional factorial experimental design was conducted to study the effects of molecular weight on melt strength improvements as measured by strand drop time. Results from the experimental design indicated that in the modifier compositional domain described herein, every reduction in molecular weight by half a million of the modifier, leads to an average reduction of two seconds in strand drop time. Based on these results, it was concluded that the molecular weight of the melt strength modifiers of this invention should be greater than one million to be effective. The preferred modifier molecular weight is between about 1.5 million to about 4.0 million, because molecular weights greater than 4 million are difficult to achieve, and molecular weights greater than or equal to 1.5 million have increased strand drop time (when compared to molecular weight modifiers below 1.5 million).

APPARATUS AND GENERAL PROCEDURE

Standard ASTM family molds are employed. Refractive Indexes are determined according to ASTM-D-524 and light transmission and haze according to ASTM-D-1003.

The copolymer modifiers in Tables I-III were prepared by emulsion polymerization. A typical reaction was done in a 3 liter, 4-neck round-bottom flask fitted with a thermometer, a stirrer, a condenser and a heating mantle. The flask was first filled with a solution of 1800 g. of deionized water, 0.4 g. of acetic acid, 0.01 g. of Fe.SO$_4$, and 0.12 g. of ethylenediamine tetreacetic acid disodium salt dihydrate (i.e. g.=gram). The solution was sparged with nitrogen gas while heated to 75° C. At 75° C., 366.1 g. of styrene, 14.4 g. of hydroxyethyl methacrylate, and 95.5 g. of butyl methacrylate monomer emulsified in 150 g. of water with 5.4 g. sodium dodecylbenzene sulfonate was added to the flask, and 0.45 g. of sodium persulfate was added as an initiator. The reaction was then allowed to proceed for approximately two hours or until more than 99.9% of the monomers were converted by a check of the solids content. After the reaction was done, the emulsion was cooled to room temperature, and spray dried into a white, free flowing powder.

The molecular weights of the modifiers were determined by Waters Gel Permeation Chromatography using tetrahydrofuran as a solvent and polystyrene as a calibration standard. Weight average molecular weights ranged from 1.5 million to 4.0 million (MM), and the refractive index ranged from about 1.55 to about 1.58. Copolymers of similar compositions usually had similar molecular weights. The effect of molecular weight above 4.0 million on melt strength improvement is reduced by the fact that higher molecular weight modifiers are usually more difficult to disperse. The copolymer modifiers and their compositions are listed in Tables I-III (i.e. Examples The copolymer modifiers were blended with polyester in a 1 inch, 24/1 length/diameter ratio, single screw extruder at the concentrations (i.e. modifier loading (%)), screw speed and melt temperatures listed in Tables I-III. Melt strength was determined by extruding a 3/16 inch diameter strand of the polyester/modifier blend from a die on the extruder which was directed downward. A high compression mixing screw (i.e. 2-stage screw, 3.5/1 compression ratio) was used at the screw speed specified in Tables I-III. The melt temperature was measured at the die with a pyrometer. The melt strength was measured by strand drop time, the time required for a strand emerging from the die to drop to the floor, a distance of about 40 inches. The degree of die swell in the extruded strands also provided a qualitative indication of melt strength. Long drop times were normally accompanied by high die swell. The degree of copolymer modifier dispersion was indicated by the smoothness of the strands.

The conditions of the strand drop time test simulate what a polymer melt encounters in the extrusion blow molding process where a parison is normally extruded downward and must remain suspended for a few seconds until it is enclosed by the mold. Although the drop time test is a very practical one, it lacks a high degree of precision (i.e. roughly a 15% variation in drop time for unmodified polyesters extruded under the same conditions). Variations in melt temperature and screw speed also influence the drop time.

Tables I-III describe the effect of different modifiers (e.g. styrene copolymers or terpolymers) on the melt strength of a commercial PET resin, Goodyear's PET 9506, which has an intrinsic viscosity (IV) of 0.95 dl/g (ASTM D-4603), a commercial copolyester, Eastman's PETG 6763, with a 0.74 dl/g IV (ASTM D-4603), and another commercial copolyester, Eastman's Tenite 9921, with a 0.8 dl/g IV (ASTM D-4603). Many of the copolymer modifiers have RI's approximating those of the polyesters or copolyesters so that clear strands were extruded. Exact RI matches can be achieved by adjusting the copolymer composition without significantly affecting the melt strength.

Drop times of 7 to 10 seconds are generally indicative of compositions and conditions for which extrusion blow molding is possible but higher values are preferred for better process control. In spite of the limited precision of the drop time test, the large increases in drop time obtained with the copolymer modifiers listed in Tables I–III clearly indicate sufficient melt strength improvement for advantages and improvement in extrusion blow molding.

TABLE I
EFFECT OF COPOLYMER MODIFIER COMPOSITION ON POLYESTER MELT STRENGTH
GOODYEAR 9506

| Example Number | Modifier Composition* | Polyester | Modifier Loading (%) | Screw Speed (RPM) | Melt Temp (°F.) | Stand Drop Time (sec) |
|---|---|---|---|---|---|---|
| 1+  | None              | Goodyear 9506 | 0  | 100 | 573 | 3.8  |
| 3+  | 50ST/50HEMA       | Goodyear 9506 | 10 | 100 | 573 | 4.4  |
| 2** | 95ST/5HEMA        | Goodyear 9506 | 10 | 100 | 575 | 11.7 |
| 6+  | 75ST/10BMA/15MAA  | Goodyear 9506 | 10 | 50  | 531 | 2.7  |
| 4** | 70ST/25BMA/5HEMA  | Goodyear 9506 | 10 | 100 | 572 | 6.8  |
| 5** | 75ST/10BMA/15HPMA | Goodyear 9506 | 10 | 50  | 536 | 5.0  |
| 7+  | None              | Goodyear 9506 | 0  | 100 | 543 | 4.3  |
| 8** | 78ST/17BMA/5HEMA  | Goodyear 9506 | 10 | 100 | 537 | 9.3  |
| 9** | 78ST/17BMA/5HPMA  | Goodyear 9506 | 10 | 100 | 536 | 10.4 |

TABLE II
EFFECT OF COPOLYMER MODIFIER COMPOSITION ON POLYESTER MELT STRENGTH
EASTMAN PETG 6763

| Example Number | Modifier Composition* | Polyester | Modifier Loading (%) | Screw Speed (RPM) | Melt Temp (°F.) | Stand Drop Time (sec) |
|---|---|---|---|---|---|---|
| 10+  | None              | Eastman PETG 6763 | 0  | 50  | 445 | 10.2 |
| 12+  | 80ST/15BMA/5MAA   | Eastman PETG 6763 | 10 | 50  | 448 | 11.6 |
| 11** | 80ST/15BMA/5HPMA  | Eastman PETG 6763 | 10 | 50  | 449 | 19.7 |
| 16+  | 75ST/10BMA/15MAA  | Eastman PETG 6763 | 10 | 50  | 448 | 13.9 |
| 13** | 75ST/21BMA/4GMA   | Eastman PETG 6763 | 10 | 50  | 453 | 17.2 |
| 14** | 76ST/22BMA/2GMA   | Eastman PETG 6763 | 10 | 50  | 452 | 12.2 |
| 15** | 75ST/10BMA/15HPMA | Eastman PETG 6763 | 10 | 50  | 448 | 21.4 |
| 18+  | 70ST/30BMA        | Eastman PETG 6763 | 10 | 50  | 453 | 8.2  |
| 17** | 60ST/40HEMA       | Eastman PETG 6763 | 10 | 50  | 449 | 12.1 |
| 20+  | 95ST/5MAA         | Eastman PETG 6763 | 10 | 50  | 450 | 8.2  |
| 19** | 95ST/5HEMA        | Eastman PETG 6763 | 10 | 50  | 453 | 15.8 |
| 21+  | None              | Eastman PETG 6763 | 0  | 100 | 448 | 7.5  |
| 22** | 76ST/21BMA/3HEMA  | Eastman PETG 6763 | 5  | 100 | 450 | 15.6 |
| 23** | 76ST/21BMA/3HPMA  | Eastman PETG 6763 | 5  | 100 | 446 | 15.3 |
| 24** | 78ST/17BMA/5HEMA  | Eastman PETG 6763 | 10 | 100 | 446 | 17.6 |
| 25** | 78ST/17BMA/5HPMA  | Eastman PETG 6763 | 10 | 100 | 445 | 20.0 |

TABLE III
EFFECT OF COPOLYMER MODIFIER COMPOSITION ON POLYESTER MELT STRENGTH
EASTMAN TENITE 9921

| Example Number | Modifier Composition* | Polyester | Modifier Loading (%) | Screw Speed (RPM) | Melt Temp (°F.) | Stand Drop Time (sec) |
|---|---|---|---|---|---|---|
| 26+  | None              | Eastman Tenite 9921 | 0  | 100 | 481 | 6.4  |
| 35+  | Polystyrene       | Eastman Tenite 9921 | 10 | 100 | 488 | 5.3  |
| 36+  | 95MMA/5HPMA       | Eastman Tenite 9921 | 10 | 100 | 486 | 5.9  |
| 27** | 74ST/21BA/5HPMA   | Eastman Tenite 9921 | 10 | 100 | 483 | 10.9 |
| 28** | 77ST/18BMA/5HPMA  | Eastman Tenite 9921 | 10 | 100 | 481 | 8.3  |
| 29** | 77ST/15BMA/8HPMA  | Eastman Tenite 9921 | 10 | 100 | 480 | 11.8 |
| 30** | 78ST/19BMA/3HPMA  | Eastman Tenite 9921 | 10 | 100 | 482 | 8.9  |
| 31** | 78ST/21BMA/1HEMA  | Eastman Tenite 9921 | 10 | 100 | 484 | 7.6  |
| 32** | 78ST/20BMA/2HEMA  | Eastman Tenite 9921 | 10 | 100 | 485 | 8.6  |
| 33** | 78ST/19BMA/3HEMA  | Eastman Tenite 9921 | 10 | 100 | 483 | 9.9  |
| 34** | 75ST/22BA/3HEMA   | Eastman Tenite 9921 | 10 | 100 | 483 | 13.0 |

KEY:
*ST = styrene
HEMA = hydroxy ethyl methacrylate
HPMA = hydroxy propyl methacrylate
MAA = methacrylic acid
GMA = glycidyl emthacrylate
BMA = butyl methacrylate
BA = butyl acrylate
MMA = methyl methacrylate
**Improved Modifier Composition Examples
+ Comparative Examples

We claim:
1. A copolymer comprising:
   (A) about 60 to about 99 percent by weight derived from a vinyl aromatic monomer;
   (B) about 1.0 to about 40 percent by weight derived from a hydroxy alkyl (meth)acrylate or epoxy alkyl (meth)acrylate; and
   (C) 0 to about 25 percent by weight derived from an alkyl (meth)acrylate; in which the copolymer has a molecular weight of about 1.0 million to about 4.0 million.

2. The composition of claim 1 wherein the vinyl aromatic monomer is styrene, para-methyl styrene, chlorostyrene, vinyl toluene, dibromostyrene, tribromostyrene, or vinyl naphthylene.

3. The composition of claim 2 wherein the hydroxy alkyl (meth)acrylate or epoxy alkyl (meth)acrylate is hydroxy ethyl (meth)acrylate, hydroxy propyl (meth)acrylate, or glycidyl (meth)acrylate.

4. The composition of claim 3 wherein the alkyl (meth)acrylate is $C_1$–$C_4$ alkyl (meth)acrylate.

5. The composition of claim 1 wherein the refractive index is from about 1.55 to about 1.58.

6. The composition of claim 2 comprising from about 60 to about 99 percent by weight derived from styrene and from about 1.0 to about 40 percent by weight derived from hydroxy ethyl methacrylate or hydroxy propyl methacrylate.

* * * * *